A. MANS.
SOLID TIRE FOR VEHICLE WHEELS.
APPLICATION FILED MAR. 26, 1909.
962,444. Patented June 28, 1910.
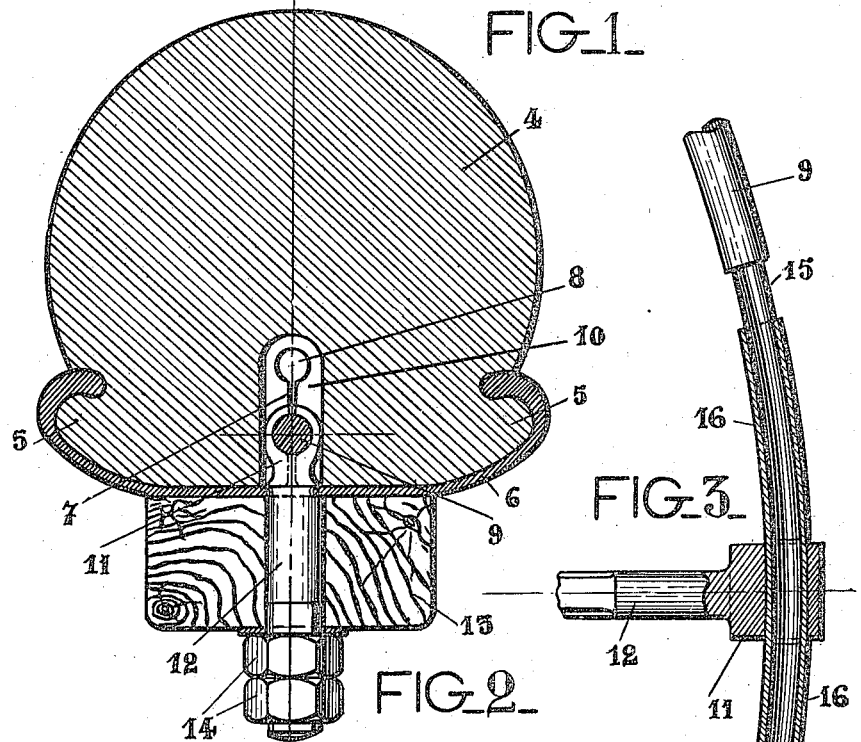
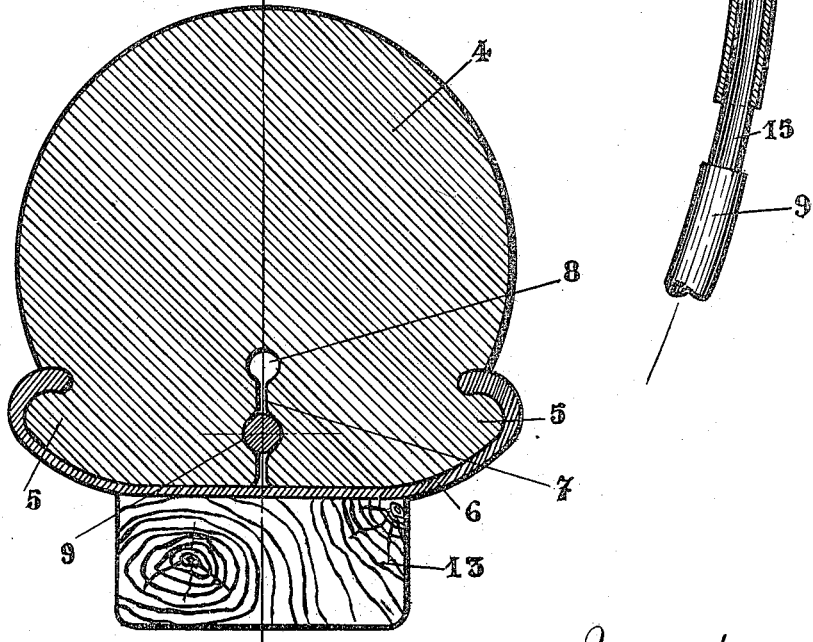
Witnesses:
I. Spantikow
HCHunsberger
Inventor:
Albert Mans
by B. Singer
Attorney

UNITED STATES PATENT OFFICE.

ALBERT MANS, OF DIEGHEM, BELGIUM.

SOLID TIRE FOR VEHICLE-WHEELS.

962,444.

Specification of Letters Patent. Patented June 28, 1910.

Application filed March 26, 1909. Serial No. 486,053.

*To all whom it may concern:*

Be it known that I, ALBERT MANS, a subject of the King of Belgium, and residing in Dieghem, Villa "Les Lierres," in the Kingdom of Belgium, have invented certain new and useful Improvements in Solid Tires for Vehicle-Wheels, of which the following is a specification.

The invention relates to a solid rubber tire adapted to be easily fitted up and taken down by a fixing arrangement procuring entire security against its being torn up.

The accompanying drawing shows a form of construction of said tire.

Figure 1 is a cross section of this tire according to an axial plane of one of the tightening bolts of the rod producing the blocking of the shoulders. Fig. 2 is a transverse sectional view of the same tire according to a radial plane between two tightening bolts. Fig. 3 a detail view showing the mode of connecting the ends of the wedging rod.

The tire is formed by a rubber ring 4 having shoulders 5, catching into the flanges of the metallic rim 6. At its base said ring has an axial slit 7 extending to an annular groove 8 formed in the mass of the tire, in which groove an extensible steel rod 9 may be introduced before the fitting of the tire on the felly.

At equal distances radial cavities like 10 are formed in the rubber mass in order to receive the heads 11 of the bolts 12, said heads being slid on the rod 9. The bolts 12 pass radially through the steel rim 6 and the wooden felly 13 and may be tightened by means of nuts 14, said rod being thus drawn toward the center, extending the edges of the slit 7, that is to say, forcing the shoulders 5 into the flanges of the rim 6.

The extensible rod 9 is formed as an open ring, the ends 15 of which have a smaller diameter and may slide freely in a curved sleeve 16 having the same exterior diameter as the body of said rod (Fig. 3). The head of one of the tightening bolts 12 is slid on said sleeve 16, before the connection of both ends 15.

The fitting of the tire on the felly is operated as follows: All the bolts having been slid on the rod 9 and on the connecting sleeve 16, said rod is forced through the slit 7 into the annular groove 8, the heads 11 of the bolts being naturally placed in the cavities 10. The operation is facilitated by the extensibility of the rod itself. The latter being located in the annular groove 8, leaves the slit 7 entirely free to close up, thus allowing the shoulders 5 to come together and to permit of introducing the base of the tire into the rim. It will then be sufficient to tighten gradually the nuts of all the bolts, thus causing the rod to be contracted and the slit to be extended, the effect of which will be to force the shoulders into the flanges of the rim.

I claim as my invention:

1. In combination, a solid tire having laterally disposed beads, a rim having flanges for engaging said beads, said tire having a slit extending radially from below to a point above said beads and having an outer circumferential rod receiving enlargement above said beads and an inner circumferential rod receiving enlargement between said beads, an annular extensible and contractible rod adapted to be expanded into said outer enlargement to permit insertion of the base of said tire between said flanges, and means for contracting said rod and drawing the same into said inner enlargement to spread the base of the tire and force the beads thereof into engagement with said flanges.

2. In combination, a solid tire having laterally disposed beads, a rim having flanges for engaging said beads, said tire having an annular slit extending radially from below to a point above said beads and having an outer circumferential rod receiving enlargement above said beads and an inner circumferential rod receiving enlargement between said beads, an annular extensible and contractible rod adapted to be expanded into said outer enlargement to permit insertion of said tire between said flanges, the ends of said rod being reduced, a sleeve on the ends of said rod and slidably engaging the same, and means connected with said sleeve for contracting said rod and drawing the same into said inner enlargement to spread the base of the tire and force the beads thereof into engagement with said flanges.

3. In combination, a solid tire having laterally disposed beads, a rim having flanges for engaging said beads, said tire having an annular slit extending radially from below to a point above said beads and having an outer circumferential rod receiving enlargement above said beads and an inner circumferential rod receiving enlargement between said beads, said tire having a chamber intersecting said slit and outer and inner enlargements, an annular extensible and contractible rod adapted to be expanded into said outer enlargement to permit contraction of the base of the tire between said flanges, said rod having its ends reduced, a sleeve slidably mounted on the reduced ends of said rod, a headed bolt engaging the said sleeve and disposed in one of said chambers, and means connected with said bolt for drawing the rod into said inner enlargement to spread the base of the tire and force the beads thereof into engagement with said flanges.

In testimony whereof I affix my signature in presence of two witnesses.

ALBERT MANS.

Witnesses:
L. PARETTE,
G. PHELAN.